No. 836,772. PATENTED NOV. 27, 1906.
A. H. MARKS.
PROCESS OF MANUFACTURING PNEUMATIC TIRES.
APPLICATION FILED JAN. 13, 1906.

2 SHEETS—SHEET 1.

Witnesses
Jas. A. Koehl
Kenneth P. Clarke

Inventor
Arthur H. Marks
By Parsons, Burch and
James P. Bevans
Attorneys

UNITED STATES PATENT OFFICE.

ARTHUR HUDSON MARKS, OF AKRON, OHIO.

PROCESS OF MANUFACTURING PNEUMATIC TIRES.

No. 836,772.  Specification of Letters Patent.  Patented Nov. 27, 1906.

Application filed January 13, 1906. Serial No. 295,952.

*To all whom it may concern:*

Be it known that I, ARTHUR HUDSON MARKS, a citizen of the United States, residing at Akron, in the county of Summit and State of Ohio, have invented new and useful Improvements in the Process of Manufacturing Pneumatic Tires, of which the following is a specification.

This invention relates to an improved process of manufacturing pneumatic tires; and the object is to provide a simple and effective process for producing a double or diaphragm inner tube—that is, an inner tube formed with two air-chambers, each one inflatable independent of the other.

With the above object in view the invention consists in the novel features of construction hereinafter fully described, particularly pointed out in the claims, and clearly illustrated by the accompanying drawings, in which—

Figure 1:
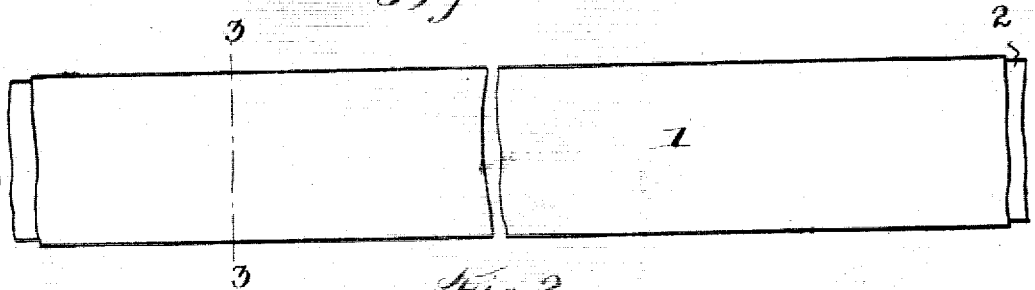
Figure 2:
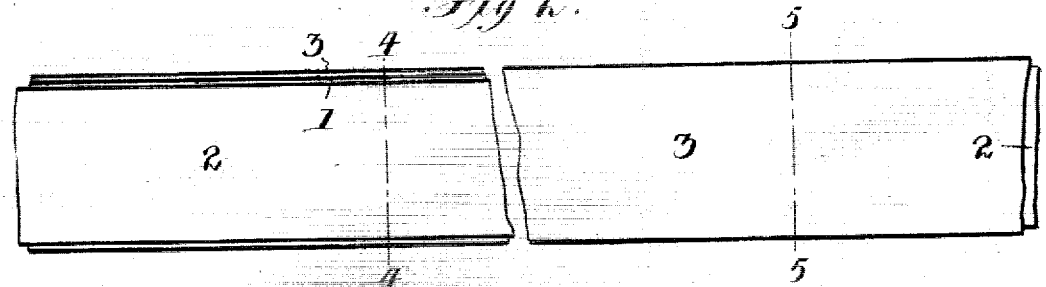
Figure 3:
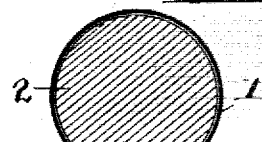
Figure 4:
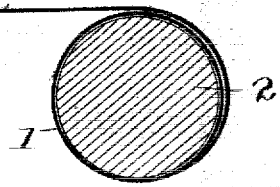
Figure 5:
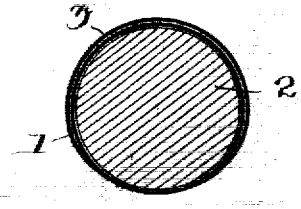
Figure 6:
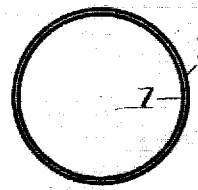
Figure 7:
Figure 8:
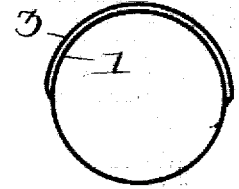
Figure 9:
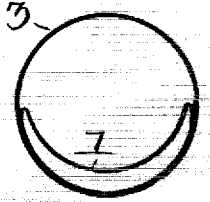
Figure 10:
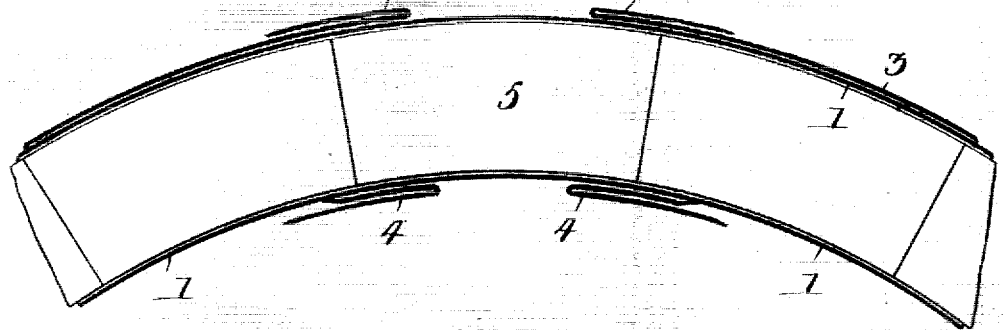
Figure 11:
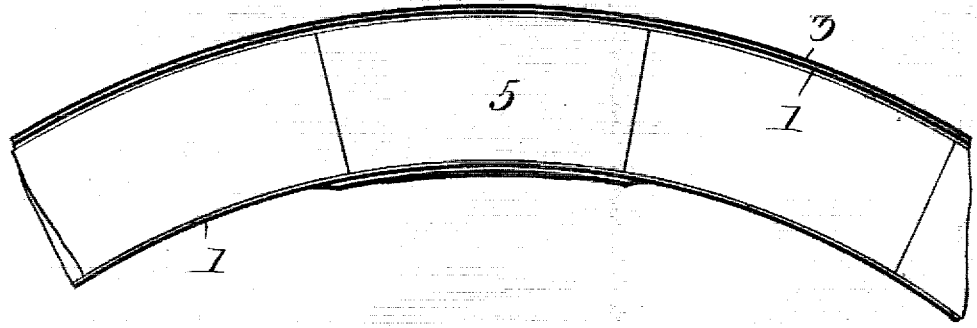

Figure 1 is a view showing the mandrel with the first layer of material placed thereon; Fig. 2, a view, partly in elevation and partly in section, showing the mandrel with the two layers of material; Fig. 3, a sectional view on the line 3 3 of Fig. 1; Fig. 4, a similar view on the line 4 4 of Fig. 2, the outer layer being shown preparatory to uniting one of its edges with the inner layer; Fig. 5, a sectional view on the line 5 5 of Fig. 2; Fig. 6, a sectional view through the completed tube, taken at the joint; Fig. 7, a sectional view showing the inner air-chamber collapsed; Fig. 8, also a cross-sectional view showing a modified construction in which the tube is formed of two complete layers of material; Fig. 9, a sectional view of a modified construction, showing the auxiliary air-chamber collapsed; Fig. 10, a sectional view of a portion of the tube in position upon a mandrel, showing the cuffs of the outer layer turned back to permit the joining of the ends of the inner layer; Fig. 11, a similar view illustrating the manner in which the ends of the layers forming the tube are united, and Fig. 12 a sectional view of a portion of the modification illustrated in Figs. 8 and 9.

The inner tube here illustrated is what I term a "double" or "diaphragm" inner tube, the same being formed with two air-chambers, one primary and the other auxiliary or secondary, each having a valve for inflating, the inner or auxiliary chamber being normally deflated. Upon puncture of the outer or primary air-chamber the secondary one may be inflated, so that it is not necessary to repair the tire on the road in case of puncture, unless of course the auxiliary air-chamber should be punctured after it has been brought into use.

In carrying out my improved process a layer 1, of a suitable rubber compound, is placed over a straight smooth mandrel 2. Upon this layer and extending over about one-half of the circumference thereof is placed a second layer 3 of the same material, which is cemented at its extreme edges to the first layer, a layer of wet soapstone having first been placed between the two layers of rubber for the purpose of preventing adhesion, excepting at the extreme edges of the second layer. At its extreme ends the second layer is formed completely tubular and is not united to the first layer, thus forming the cuffs 4. The structure is then partly vulcanized, and after this operation is performed it is placed over a collapsible mandrel 5. The cuffs forming the ends of the primary tube are folded back over themselves, so as to be out of the way, and the ends of the secondary tube are brought together and vulcanized. A hole is made in the inner periphery of the tube, and the collapsible mandrel is removed through this orifice in sections, the hole through which the collapsible mandrel is removed being afterward used for inserting one of the inflating-valves. The cuffs of the primary tube are then joined and the whole structure placed in a circular mold, inflated with air or steam, and the vulcanization completed.

Figure 12:
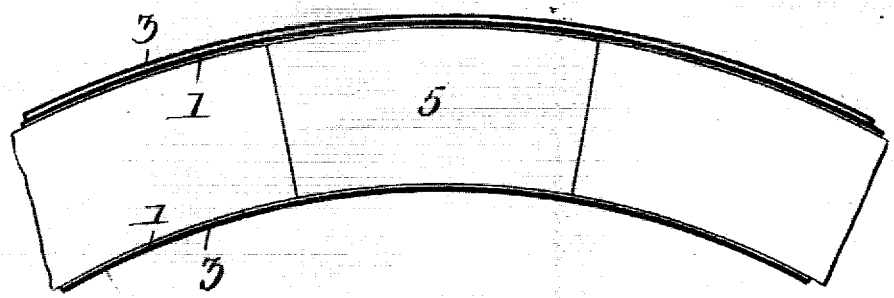

As shown in Figs. 8, 9, and 12, the outer layer can be made to completely surround the inner layer, being united thereto for a portion of its circumference, thus forming two complete tubes, the outer, excepting at its ends, being united to the inner one at a portion of its periphery.

Having thus fully described my invention, what I claim as new, and desire to secure by Letters Patent of the United States, is—

1. The improved process of forming a double or diaphragm inner tube for pneumatic tires consisting in the following steps: first, the placing of a layer of vulcanizable material about a straight mandrel; second, the placing of a second layer upon the first layer, and uniting the same thereto at a portion of its circumference; third, partly vulcanizing the two layers; fourth, removing said structure from the straight mandrel and placing the same upon a collapsible mandrel; fifth, rolling back the ends of the outer layer, and uniting the ends of the inner layer; sixth, uniting the ends of the outer layer; seventh, removing the circular mandrel; and eighth, completing the vulcanization of the structure.

2. The improved process of forming a double or diaphragm inner tube for pneumatic tires consisting in the following steps: first, the placing of a layer of vulcanizable material about a straight mandrel; second, the placing of a second layer upon the first layer and uniting the same thereto at a portion of its circumference, with the exception of its respective ends which are formed into cuffs entirely separated from the inner layer; third, partly vulcanizing the two layers; fourth, removing said structure from the straight mandrel and placing the same upon a collapsible mandrel; fifth, rolling back the cuffs and uniting the ends of the inner layer; sixth, uniting said cuffs; seventh, removing the circular mandrel, and eighth, completing the vulcanization of the structure.

3. The method of joining the ends of a double or diaphragm inner tube for pneumatic tires, consisting in folding back the ends of the primary tube, then telescoping the ends of the secondary tube over a collapsible mandrel, then uniting the ends of the primary tube, and finally, vulcanizing the whole.

4. The method of joining the ends of a double or diaphragm inner tube for pneumatic tires, consisting of first joining the ends of a secondary tube over a collapsible mandrel, then withdrawing said mandrel from the secondary tube, then telescoping the ends of the primary tube, then placing the whole tube in an endless circular mold, and finally vulcanizing the whole.

In testimony whereof I affix my signature in presence of two subscribing witnesses.

ARTHUR HUDSON MARKS.

Witnesses:
O. S. HART,
J. E. ARGUS.